United States Patent [19]

Meunier

[11] Patent Number: 4,891,700

[45] Date of Patent: Jan. 2, 1990

[54] SYSTEM FOR INSERTING A TEST SIGNAL IN A VIDEO IMAGE SCANNING LINE

[76] Inventor: Thierry Meunier, Oskar-Joos-Strasse 10, D-7730 VS-Obereschach, Fed. Rep. of Germany

[21] Appl. No.: 247,644

[22] Filed: Sep. 22, 1988

[30] Foreign Application Priority Data

Sep. 30, 1987 [DE] Fed. Rep. of Germany ....... 3732866

[51] Int. Cl.$^4$ ............................................. H04N 17/04
[52] U.S. Cl. ...................................... 358/139; 358/10; 358/74; 358/243
[58] Field of Search .................... 358/139, 10, 74, 243, 358/29, 168; 315/383

[56] References Cited

U.S. PATENT DOCUMENTS

| | | | |
|---|---|---|---|
| 3,659,044 | 4/1972 | Olson | 358/139 |
| 4,069,500 | 1/1978 | Hurst | 358/10 |
| 4,200,882 | 4/1980 | Janssen | 358/29 |
| 4,633,321 | 12/1986 | Tallant, II | 358/74 X |
| 4,694,350 | 9/1987 | Hinn | 358/242 |

FOREIGN PATENT DOCUMENTS 0093904  11/1983  European Pat. Off. .

*Primary Examiner*—James J. Groody
*Assistant Examiner*—Victor R. Kostak

[57] ABSTRACT

A television receiver includes a source of test signals for controlling parameters such as picture tube cut-off level and drive level. The test signals are inserted individually during visible scanning lines along the upper edge of the display screen, one test signal line per field, only when the brightness of a displayed picture exceeds a given level so as to mask the presence of the test signal. The test signal insertion process is disabled for low picture brightness conditions.

6 Claims, 1 Drawing Sheet

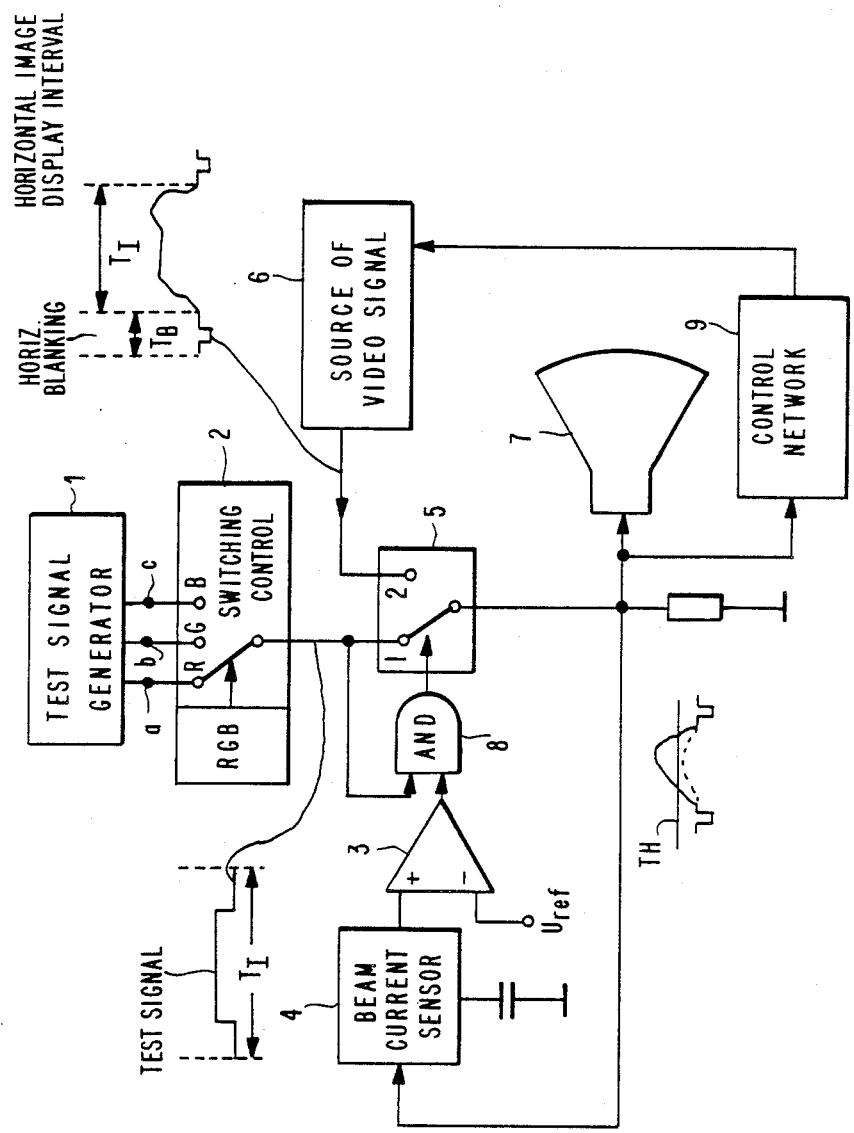

SYSTEM FOR INSERTING A TEST SIGNAL IN A VIDEO IMAGE SCANNING LINE

This invention concerns a system for inserting a test signal in a video image scanning line to facilitate the automatic adjustment of picture tube beam currents in a video signal processor such as a television receiver.

Test signals containing information to assist in automatically adjusting picture tube beam currents are typically inserted during the first few lines of the picture trace period after the vertical retrace interval in the vertical overscan region, so as to be invisible to a viewer. The test signal lines contain predetermined information for automatically controlling picture tube beam currents so as to establish desired picture white drive level, picture black cut-off level, and leakage current operating conditions, for example.

Since such test signal lines are inserted into the portion of the picture trace interval which is not seen by a viewer, the test lines normally do not interfere with the displayed picture. However, the presence of the test lines may be noticed by a viewer along the upper edge of the display screen when the displayed picture exhibits very low brightness along the upper edge of the display, due to a "halo"-type effect produced by the test line when containing white-going information. In addition, the test lines become visible and could seriously interfere with a displayed picture if the picture aspect ratio and the associated vertical deflection amplitude were to change from the present 4:3 aspect ratio to an aspect ratio of 16:9, for example. In such case the described known method of inserting the test lines would be inappropriate because the test lines may become visible along the upper edge of the display screen.

The disclosed system in accordance with the present invention permits the insertion of test signal lines along the upper edge of the display screen without the test lines being disturbingly visible to a viewer, even if the aspect ratio were to change to, e.g., 16:9 with reduced vertical deflection amplitude. In the disclosed system in accordance with the principles of the present invention, the test lines are successively inserted, one test line per image field, in the uppermost visible region of a displayed picture along the top edge of the display screen, only when the brightness of a displayed picture is greater than a predetermined brightness level. Insertion of the test lines is inhibited when the picture brightness is below the predetermined brightness level.

The FIGURE illustrates a portion of a television receiver including test line insertion apparatus according to the present invention.

A test signal generator 1 produces separate test signals for controlling the (black) cut-off level and the (white) drive level of a picture tube 7. These signals are produced during test line intervals for each of the red (R), green (G) and blue (B) color image signals in the case of a color television receiver, and appear in time multiplexed form at each of outputs a, b and c of generator 1. Illustratively, outputs a, b and c exhibit cut-off test signals for each of the R, G, B signals during test line intervals in respective first, second and third fields. These outputs exhibit drive test signals for each of the R, G, B signals during test line intervals in respective fourth, fifth and sixth fields. The test signals appear consecutively at an output of a counter and switching control network 2, which is synchronized at the field rate and has R, G, B switching positions, so that test signals from terminals a, b and c appear at the output of network 2 separately during consecutive fields. Thus, in the case of red signal R, for example, a red cut-off test signal appears at the output of network 2 in a first field, and a red drive test signal appears at the output of network 2 in a succeeding fourth field. One RGB switching cycle of network 2 occurs over three fields, and six fields are required to complete one RGB cut-off and drive test cycle. Preferably each test signal is inserted in the first horizontal scanning line in the visible display region of its respective field. The test signals are coupled to the video signal processing path between the output of a video signal source 6, e.g., including a video amplifier, and picture tube 7 via an electronic switch 5. One test signal line is inserted in each field.

The insertion of a test signal line into the video signal path depends, however, on the presence of a predetermined level of brightness of a displayed picture. In this regard the disclosed system also includes a picture tube beam current sensor 4 which senses the magnitude of the brightness representative average picture tube beam current. Average beam current sensor arrangements are well known. A voltage representative of the sensed beam current magnitude is applied from the output of sensor 4 to a noninverting input (+) of a comparator 3, where the sensed level is compared with a reference voltage Uref applied to an inverting input (−) of comparator 3. The output of comparator 3 is applied to one input of a logic AND gate 8, another input of which is coupled to the output of network 2 at which the test signals appear. If the value of the sensed beam current exceeds reference level Uref, and if a test signal is present at the output of network 2, an output signal from AND gate 8 causes switch 5 to occupy a position 1 as shown. In this position switch 5 decouples the video signal (applied to terminal 2 of switch 5 from source 6) from the signal path to picture tube 7, and instead conducts a test signal line from network 2 to the picture tube. In contrast, if the picture content exhibits a lower brightness level below a threshold level TH shown associated with the video signal waveform, or if a test signal is not present at the output of network 2, the output signal from comparator 3 will cause switch 5 to occupy position 2 for conducting the video signal from the output of source 6 to the picture tube.

When present, the test signal line is monitored at the input, e.g., the cathode electrode input, to picture tube 7 by a control network 9 for automatically adjusting the magnitude of the white level or black level cathode current conducted by the picture tube, in response to the magnitude of the associated test signal as sensed by network 9. Control networks such as network 9 are well-known, and network 9 does not form part of the invention per se. Such control networks typically operate by developing an output error signal in accordance with a difference between the magnitude of the sensed test signal and an internal reference level, and applying the error signal to video signal processing circuits, such as included in source 6, for correcting a picture tube beam current conduction condition via feedback control action.

The disclosed system offers several advantages. It is not necessary to dedicate a separate scanning line specifically for the use of a test signal. In addition, displaying only one of the test signal lines per field rather than displaying a group of test lines in a given field significantly reduces the chance that a test line interval will be seen by a viewer. Also, the test signal line is absent if the displayed picture does not exhibit sufficient brightness above a given level, in which case insertion of the test signal does not occur. When displayed, the test signal line is virtually invisible since it mixes with the surrounding high brightness picture area.

What is claimed is:

1. In a video signal processing system including an image display device for displaying an image in response to an image component of a video signal, apparatus comprising:

a video signal path for conveying said image component to said image display device;

means for generating a test signal for use in automatically adjusting a system parameter affecting the magnitude of current conducted by said display device;

means for selectively inserting said test signal into said video signal path during a scanning line image display interval in an initial visible portion of an image scanning field; and control means coupled to said inserting means for enabling said test signal to be inserted into said video signal path when the brightness of a displayed image exceeds a given level, and for inhibiting the insertion of said test signal at other times.

2. A system according to claim 1, wherein:
said control means includes means responsive to the magnitude of current conducted by said image display device.

3. A system according to claim 1, wherein:
said test signal is inserted in a first visible horizontal scanning line of an image field.

4. A system according to claim 1, wherein:
said test signal is inserted during consecutive image fields.

5. A system according to claim 1, wherein:
said generating means provides plural test signals each respectively to be used for adjusting system parameters affecting the magnitude of said display device current; and
said plural test signals are separately inserted during separate consecutive image fields.

6. A system according to claim 5, wherein:
said plural test signals include signals to be used for adjusting cut-off and drive levels, respectively.

* * * * *

UNITED STATES PATENT AND TRADEMARK OFFICE
CERTIFICATE OF CORRECTION

PATENT NO. : 4,891,700

DATED : January 2, 1990

INVENTOR(S) : Thierry Meunier

It is certified that error appears in the above-identified patent and that said Letters Patent is hereby corrected as shown below:

On the cover sheet, after inventor, insert --[73] Assignee: Deutsche Thomson-Brandt GmbH, Villingen-Schwenningen, Fed. Rep. of Germany--.

Signed and Sealed this

Thirty-first Day of March, 1992

Attest:

HARRY F. MANBECK, JR.

*Attesting Officer*   *Commissioner of Patents and Trademarks*